Jan. 22, 1957
E. KOCH
2,778,614
MIXER
Filed March 22, 1954
3 Sheets-Sheet 1
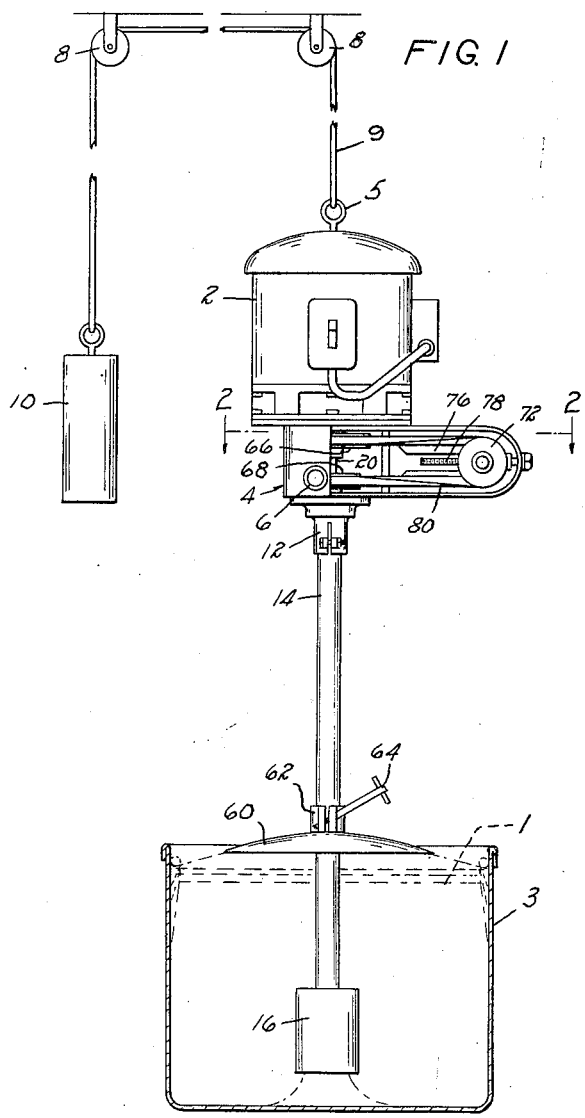
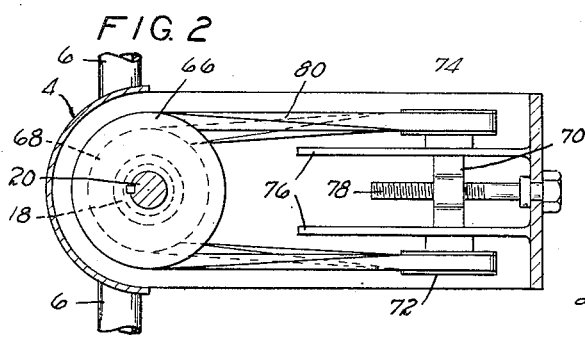
INVENTOR.
EDWARD KOCH
BY
Lindsey and Pretzman
ATTORNEYS Jan. 22, 1957　　　　　　　E. KOCH　　　　　2,778,614
　　　　　　　　　　　　　　MIXER
Filed March 22, 1954　　　　　　　　　　　3 Sheets-Sheet 2
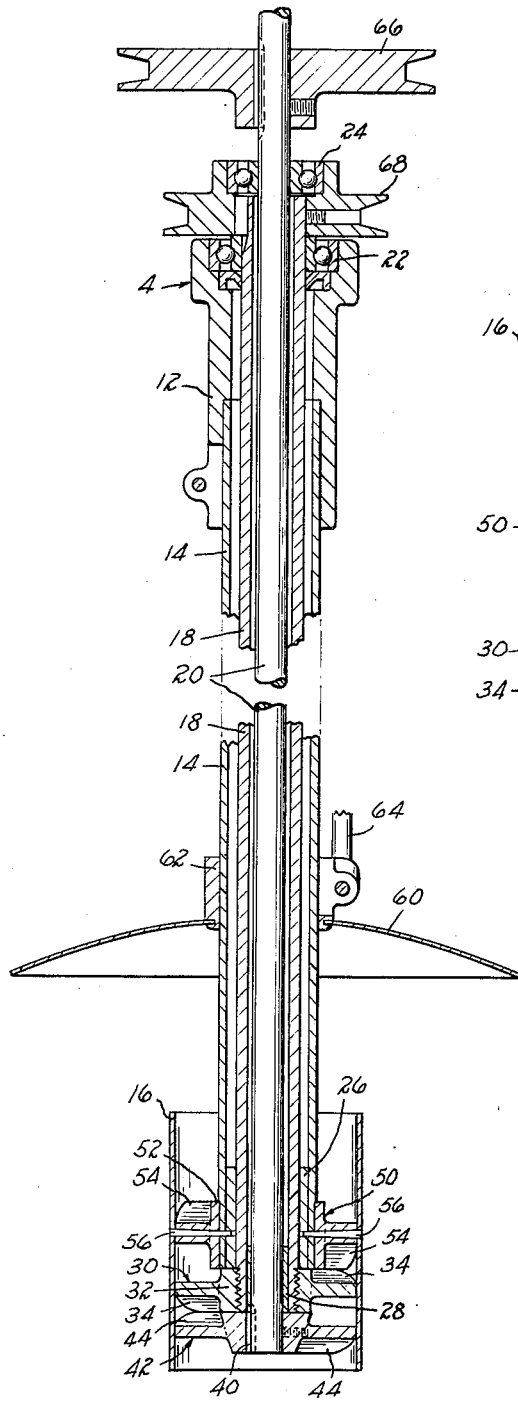
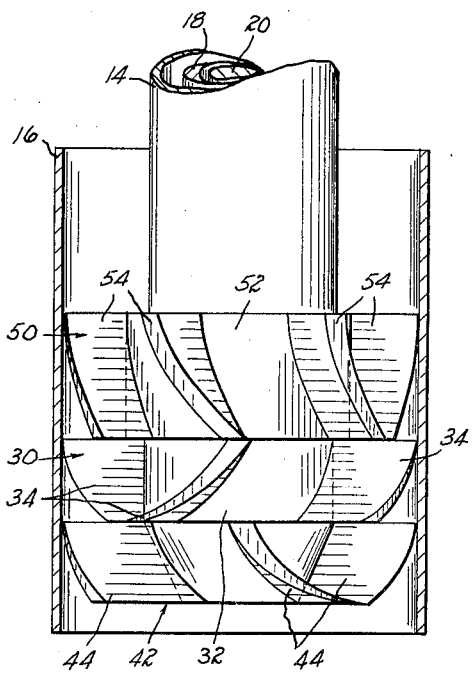
INVENTOR.
EDWARD KOCH
BY
Lindsey and Prutzman
ATTORNEYS

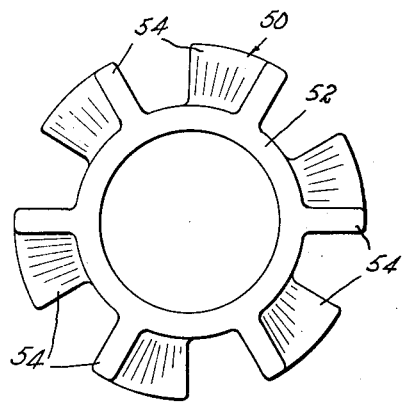
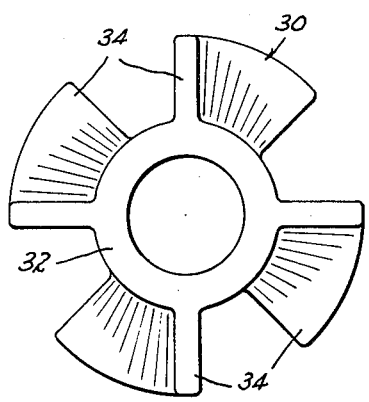
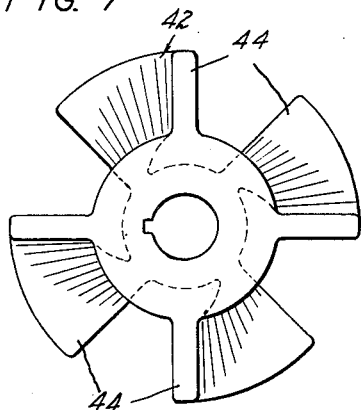

United States Patent Office 2,778,614
Patented Jan. 22, 1957

2,778,614
MIXER

Edward Koch, Norwich, Conn.

Application March 22, 1954, Serial No. 417,693

11 Claims. (Cl. 259—132)

The present invention relates to a mixer especially adapted for mixing, churning, blending, etc. fluid or semi-fluid materials such as paint, viscous liquids, chemical solutions, plastics or the like.

The principal object of the present invention is to provide an improved mixing apparatus which is convenient and easy to use, and is effective for rapidly and smoothly mixing a variety of materials.

Another object is to provide a mixer of the character described having improved means for creating a maximum shearing effect on the materials being mixed, with a minimum of cavitation.

Another object is to provide a mixer which is suitable for use with materials in containers of a variety of sizes and shapes, while insuring thorough and continuous circulation of the entire contents of a container through the working or agitating members of the mixer.

Another object is to provide a mixer having an improved driving arrangement for the working members which is simple and rugged in construction, operates with reduced noise, and is easy to maintain.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawings:

Figure 1 is an elevation view of a mixer constructed in accordance with the present invention showing its relative disposition in a container or vessel of material to be mixed;

Figure 2 is an enlarged sectional view of the apparatus shown in Figure 1 taken on the line 2—2 thereof;

Figure 3 is an enlarged vertical sectional view of a portion of the apparatus shown in Figure 1 depicting the internal arrangement of parts thereof;

Figure 4 is a further enlarged view of a portion of the mixer shown in Figure 3; and Figures 5, 6 and 7 are enlarged views of the stator and impeller portions of the mixer.

Referring to the drawings and particularly Figure 1, a specific embodiment of a mixer constructed in accordance with the invention is shown in operating position with its lower end or beater section immersed in a fluid mass 1 which is to be mixed or blended, the mass 1 being contained in an exemplary container 3. The mixer is driven by a motor 2 disposed at its upper end, the motor being preferably disposed with its shaft vertical, and having an eye-bolt 5 or other connector by means of which the mixer may be suspended from an overhead support. A typical counterbalancing support arrangement is illustrated by pulleys 8, cable 9 and weight 10 permitting the mixer to be raised and lowered easily by a single man whereby it may be conveniently and easily immersed in or withdrawn from a container of material to be mixed.

To the bottom of the frame of the motor is secured a casing 4 from which extends laterally a pair of handlebars 6 by means of which the mixer may be grasped for raising or lowering, and also guided and positioned when in use. In this way, the mixer is effectively rendered semi-portable and may be quickly and easily transferred from one container of material to another.

Secured by means of a split collar 12 on casing 4 and depending therefrom is an elongated tube or sleeve 14 which is adapted to be immersed at its lower end in the material to be mixed. As more particularly described hereinafter, the sleeve carries at its lower end an open-ended coaxially disposed cylindrical housing or tube 16 within which are disposed the working or material-agitating members of the mixer.

Turning now to Figures 3 and 4, which show the details of construction of the mixer, there are concentrically mounted for rotation within sleeve 14 a hollow outer impeller shaft 18, supported by upper bearing 22 and lower bearing 26, and a solid inner impeller shaft 20, supported by upper bearing 24 and lower bushing 28. The inner shaft 20 is preferably connected in direct driving engagement with the shaft of the motor 2, for rotation thereby. The outer shaft 18 is rotated in a direction opposite to that of the inner shaft by a driving arrangement which will presently be described. Mounted on the lower end of outer shaft 18 and fixed for rotation therewith is a screw impeller 30 which, as shown in Figure 6, has an annular hub 32 from which extends a plurality of radially disposed vanes or blades 34. The blades 34 are inclined or pitched in accordance with the direction of rotation of outer shaft 18 so as to pump or propel material to be mixed in an upward direction. Preferably the blades are somewhat helically shaped to increase their efficiency. The hub 32 of impeller 30 is bored out to permit the lower end of the inner shaft 20 to extend therethrough.

Mounted on the lower end of inner shaft 20 below impeller 30, and fixed for rotation on shaft 20 by a key 40 or the like is a second screw impeller 42, which also has a plurality of radially disposed blades 44, as shown in Figure 7, extending from a frusto-conical hub and helically inclined in the opposite direction to blades 34 so as to co-operate therewith in propelling material being mixed in an upward direction. The outside diameter of the two impellers 30, 42 is preferably the same, and the impellers are disposed preferably in closely adjacent side-by-side relation so that the adjacent radial edges of their blades pass closely adjacent as the impellers are rotated and thus have an excellent agitating and shearing effect on the material being mixed.

Co-operating with the two impellers is a stationary diffuser or stator 50, which is mounted on the lower end of the sleeve 14 immediately above the impeller 30. The stator 50 includes an annular hub or collar 52 which is of greater diameter than hub 32 supported on sleeve 14 and a plurality of radially extending blades 54, as shown in Figure 5, preferably helically shaped, and inclined in the opposite direction to the blades 34 of impeller 30. The stator blades 54 preferably have the same outside diameter as the impeller blades, and are somewhat broader in an axial direction as best shown in Figure 4.

For the purpose of channeling flow of material being mixed through the contrarotating impellers 30, 42 and the fixed stator 50, there is provided in accordance with the invention an open-ended, generally cylindrical housing or tube 16 which is coaxially disposed in closely surrounding relation with the stator and impellers, and is secured between its ends to the periphery of stator 50 by taper pins 56 or the like. The taper pins may extend through the stator blades 54 and into the sleeve 14 and bearing 26 to form a securely joined, substantially integral structure. The open upper end of the tube 16 is spaced above stator 50, and the lower end of the tube extends down below the lowermost impeller 42, forming a passage through which material is drawn in and propelled upwardly through tube 16 in a tortuous manner by the blades of the impellers and stator, while being subjected to the shearing and mixing action thereof.

The inside diameter of tube 16 is preferably such in relation to the diameter of the stator 50 and impellers 30, 42 that the impellers rotate within the tube with only a small clearance therefrom, and this factor together with the small axial clearance between adjacent edges of the blades of the impellers and the stator insures that material drawn in and propelled through the tube will be subjected to intense localized agitation, reversals of direction, and extreme shearing action which rapidly and effectively mixes and blends even the most viscous materials. The tube meanwhile serves to confine the material being mixed closely about the stator and rotating impellers, thus substantially reducing cavitation of the material, directing the flow, and increasing the effectiveness of the mixing action.

Since the action of the mixer is such as to draw the material being mixed in at the bottom of tube 16 and propel it upwardly through the tube and out its open upper end, the material is caused to flow or circulate in a somewhat toroidal pattern in its container, flowing upwardly at the center and returning downwardly at the periphery of the container. In accordance with the invention, there is provided in co-operation with the agitating portion of the mixer a disc-shaped deflector shield 60 which is adjustably supported on sleeve 14 coaxially above tube 16 by a split collar 62 and screw clamp 64. The shield 60 is several times the diameter of the tube, and is preferably slightly downwardly concave in shape. When the mixer is in operation, the shield 60 is preferably disposed slightly above the surface of the material being mixed. The purpose of the shield 60 is to intercept the stream of material pumped upwardly through tube 16 by the impellers, and to deflect this material outwardly and downwardly back into the container preferably at the periphery of the upper surface of the material being blended or mixed. In this way deflector shield 60 not only prevents loss of material from the container, but assists in completing the toroidal circulation pattern of the material being mixed. In the preferred operation of the mixer, the impellers 30 and 42 are driven at higher speed so that the material being mixed is projected against the deflector shield 60 at high velocity, the shield 60 co-operating with the agitating portion of the mixer to provide a splash plate or additional impact surface for the material being mixed, thus further increasing its homogeneity, and causing the material to be deflected with substantial force and velocity outwardly against the sides of the container, as shown in dash and dot lines in Figure 1, where its impact further increases its mixing and also serves to scour material adjacent the wall of the container into the circulation stream. Thus, excellent and rapid circulation of all the material in the container through the agitating portion of the mixer is insured, and a rapid, effective and homogeneous blending of the entire contents of the container is obtained, while aeration is kept to a minimum.

For driving the inner shaft 20 and outer shaft 18 in opposite directions, there is provided in accordance with the invention a simple, quiet and easily maintained driving arrangement which includes a pulley 66 secured to the upper end of inner shaft 20 for rotation thereby and another pulley 68 secured to the upper end of outer shaft 18 for rotation therewith. Spaced from pulleys 66, 68 and disposed generally transversely to shafts 18, 20 is a bracket 70, on which is rotatably supported a pair of transfer or idler pulleys 72, 74. The bracket is slidably supported for motion toward and away from shafts 18, 20 by a pair of slotted arms 76 secured to the casing 4. Adjustable positioning of bracket 70 is afforded by means of a threaded rod 78 rotatably supported in the end of casing 4. Looped about both the pulleys 66, 68 and the transfer pulleys 72, 74, as shown in Figures 1 and 2, is a continuous flexible belt 80. The flexible belt is driven by pulley 66 from inner shaft 20 and, in passing over the transfer pulleys 72, 74, provides a rotational drive in the opposite direction for pulley 68 and outer shaft 18. The adjustment provided by the threaded rod 78 permits tensioning of the drive belt 80 to the proper degree and also permits easy and convenient removal of the belt for repair or replacement of the belt or pulleys. The resulting drive is simple and inexpensive, and is particularly suitable for easy and convenient maintenance and repair. Moreover, the flexible belt provides a drive which is quiet in operation and substantially reduces vibration.

It will be noted that in the preferred embodiment the pulley 66 is made somewhat larger than pulley 68 to cause the tubular shaft 18, and hence the upper screw impeller 30, to turn at a slightly higher speed than the inner shaft 20 and impeller 42. This is found to have beneficial effect on the extrusion and agitation of the material through the tube 16 and increases the blending and desired flow of the material.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim:

1. A mixer comprising a pair of rotatably mounted concentric shafts, a stationary sleeve enclosing the shafts, a pair of contrarotating impellers mounted in coaxial abutting relation on the lower ends of said shafts and having radial blades helically inclined in opposite directions, a stationary diffuser comprising radial vanes extending outwardly from said sleeve in coaxial abutting relation with the upper impeller and having its radial vanes inclined oppositely to the upper impeller blades, a stationary open-ended tube coaxially enclosing said stationary diffuser and impellers intermediate its length, said tube being fixed to the stationary diffuser and supported thereby, and means for driving said shafts in opposite directions to propel material to be mixed upwardly through said tube.

2. A mixer comprising a cylindrical tube open at its ends and adapted to be immersed in a container of material to be mixed, a stationary diffuser comprising a plurality of radial vanes coaxially mounted in said tube between the ends thereof and having its radial vanes extending from a hub to the interior surface of the tube and inclined in a first direction relative to the tube axis, first and second rotary impellers rotatably mounted in said tube coaxially below said stationary diffuser, said impellers having radial vanes inclined to said tube axis in opposite directions with the vanes of the impeller nearest said stationary diffuser oppositely inclined to the vanes of the stationary diffuser, said stationary diffuser and rotary impellers being in contiguous sequence, and means for rotating said impellers in opposite directions to pump material upwardly through said tube and for shearing the material by the contiguous edges of said vanes.

3. A mixer comprising a cylindrical tube open at its ends and adapted to be immersed in a container of material to be mixed, a stationary diffuser comprising a plurality of radial vanes coaxially mounted in said tube between the ends thereof and having its radial vanes inclined in a first direction relative to the tube axis, first and second impellers of approximately equal diameter rotatably mounted in said tube coaxially below said stationary diffuser in close proximity to each other, said impellers having radial vanes inclined to said tube axis in opposite directions with the vanes of the impeller nearest said stationary diffuser oppositely inclined to said radial vanes of the stationary diffuser, and means for rotating said impellers in opposite directions at different speeds to pump material upwardly through said tube for shearing by said vanes.

4. A mixer comprising a cylindrical tube open at its ends, a stationary diffuser comprising a plurality of radial vanes coaxially mounted in said tube between the ends thereof and having its radial vanes inclined in a first direction relative to the tube axis, first and second impellers rotatably mounted in said tube coaxially below said stator, said impellers having radial vanes inclined to said tube axis in opposite directions with the vanes of the impeller nearest said stationary diffuser oppositely inclined to said vanes of the stationary diffuser, supporting means for suspending said tube in a container of material to be mixed, means for rotating said impellers in opposite directions to pump material upwardly through said tube for shearing by said vanes, and a deflector shield adjustably mounted on said supporting means above said tube in coaxial alignment therewith to intercept material pumped inwardly therethrough and deflect the same outwardly and downwardly.

5. A portable mixer comprising a stationary hollow sleeve adapted to be immersed at its lower end in a container of material to be mixed, inner and outer rotatable concentric shafts rotatably mounted within said sleeve, means on the upper end of the sleeve for rotating said shafts in opposite directions, a stationary diffuser mounted on the lower end of said sleeve comprising radially disposed helical blades inclined in a first direction, a first impeller mounted on the lower end of said outer rotatable shaft for rotation adjacent said stationary diffuser and having radially disposed blades helically inclined opposite to said first direction, a second impeller mounted on said inner shaft for rotation adjacent said first impeller and having radially disposed blades helically inclined in said first direction, and an open-ended tube coaxially mounted between its ends on the periphery of said stationary diffuser and enclosing said impellers.

6. A portable mixer comprising an elongated non-rotatable tubular housing having a lower end adapted to be immersed in a container of material to be mixed, a stationary cylindrical tube of short length coaxially supported on the lower end of the housing, a pair of rotatable impellers coaxially mounted in the tube, each impeller extending substantially entirely across the inner diameter of the tube and having a plurality of inclined vanes, the vanes of one impeller being inclined oppositely to the vanes of the other impeller, said impellers being arranged in contiguous relationship whereby during rotation of the impellers in opposite directions, the material is sheared by the contra-rotating adjacent edges of the impellers and transferred upwardly through the tube in a tortuous path, and means extending through the housing for driving the impellers in opposite directions.

7. A portable mixer comprising an elongated non-rotatable tubular housing having a lower end adapted to be immersed in a container of material to be mixed, a cylindrical tube open at its ends and of relatively short length coaxially supported by the lower end of the housing, a pair of rotatable impellers coaxially mounted within the tube and approximately equal in diameter thereto, said impellers being mounted in contiguous relationship to each other and having inclined radially extending vanes which are inclined on one impeller oppositely to the vanes of the other impeller whereby during rotation of the impellers in opposite directions the material is sheared by the contrarotating adjacent edges of the impellers and transferred upwardly through the tube in a tortuous path, drive means extending through the tubular housing for rotating the impellers in opposite directions, a deflector adjustably mounted on the housing for disposition above the level of the material being mixed, and power means at the upper end of the tubular housing connected to the drive means.

8. A portable mixer comprising an elongated non-rotatable tubular housing having a lower end adapted to be immersed in a container of material to be mixed, a cylindrical tube open at its ends coaxially supported by the lower end of the housing, a stationary diffuser in said tube comprising inclined vane means extending across the outlet end of the tube, a plurality of rotatable impellers mounted within the tube below said diffuser, said impellers having radially extending vane means inclined oppositely to each other with the vane means of the impeller immediately below the diffuser being inclined oppositely to the vane means of the diffuser, drive means extending through the tubular housing for driving the impellers in opposite directions to force the material to be mixed upwardly through the tube, and power means mounted on the upper end of the tubular housing for operating the drive means.

9. A portable mixer comprising an elongated non-rotatable tubular housing having a lower end adapted to be immersed in a container of material to be mixed, a cylindrical tube opening at its ends coaxially supported by the lower end of the housing, a stationary diffuser mounted in said tube comprising a hub and a plurality of inclined vanes extending across the annular passageway between the hub and tube, a plurality of rotatable impellers mounted within the tube below said diffuser, said impellers having radially extending vanes inclined oppositely to each other with the vanes of the impeller immediately below the diffuser being inclined oppositely to the vanes of the diffuser, drive means extending through the tubular housing for driving the impellers in opposite directions to force the material to be mixed upwardly through the tube, a deflector adjustably mounted on the tubular housing for disposition above the surface of material being mixed, and power means mounted on the upper end of the tubular housing for operating the drive means.

10. A portable mixer comprising an elongated non-rotatable tubular housing having a lower end adapted to be immersed in a container of material to be mixed, a stationary diffuser mounted on the lower end of the housing consisting of a stationary hub and a plurality of radially extending inclined vanes, a pair of coaxial impellers mounted below the diffusers, each consisting of a rotatable hub and radially extending inclined vanes, the vanes of the impeller next adjacent the diffuser being inclined oppositely from the vanes of the diffuser and from the vanes of the other diffuser, an open-ended cylindrical tube mounted about the diffuser and impellers in closely spaced arrangement to form a restricted flow passageway through the impellers and diffuser, the hubs of said diffuser and impellers being of progressively greater diameter from bottom to top to form a constriction in the flow path upwardly through the cylindrical tube, and drive means extending through the housing for rotating the impellers in opposite directions to cause an upward flow of the material in said tube.

11. In a propulsion unit for fluid material, the combination comprising a stationary open-ended tube, a first rotatable impeller in the tube comprising a rotatable member having vane means inclined relative to the axis of the tube, means for rotating the said first impeller at high speed in a direction to force fluid material through the tube in a first swirl pattern, a second rotatable impeller in the tube mounted closely adjacent to and coaxially with the first impeller on the downstream side thereof having vane means inclined oppositely to the vane means of the first impeller, means for driving the second impeller in the opposite direction at high speed to further advance the fluid material through the tube while abruptly reversing the swirl pattern thereof, and a stationary diffuser mounted closely adjacent to and coaxially with the second impeller on the downstream side thereof, said stationary diffuser comprising stationary vane means inclined oppositely to the vane means of the second impeller for causing a second abrupt interruption of the swirl pattern of the fluid material forced through the tube by the two contrarotating impellers.

References Cited in the file of this patent

UNITED STATES PATENTS

| | | |
|---|---|---|
| 614,522 | Whiting et al. | Nov. 22, 1898 |
| 671,487 | Marshke | Apr. 9, 1901 |
| 690,375 | Rübsch | Dec. 31, 1901 |
| 1,091,887 | Long | Mar. 31, 1914 |
| 1,484,945 | Hill | Feb. 26, 1924 |
| 2,209,287 | Simpson | July 23, 1940 |

FOREIGN PATENTS

| | | |
|---|---|---|
| 7,939 | Great Britain | Apr. 15, 1896 |